Jan. 10, 1967 A. EISELE 3,296,707

PRECISION BORE GAUGE

Filed April 24, 1964 2 Sheets-Sheet 1

INVENTOR.
ANDREW EISELE

BY Barthel & Bugbee
ATTORNEYS

Jan. 10, 1967 A. EISELE 3,296,707
PRECISION BORE GAUGE
Filed April 24, 1964 2 Sheets-Sheet 2
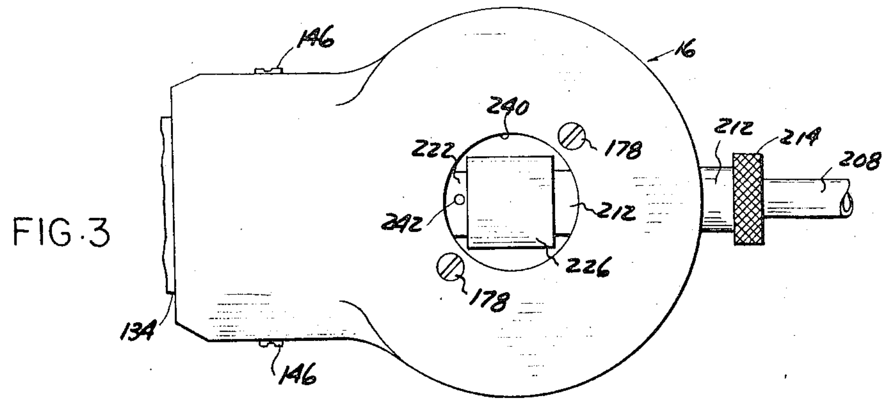
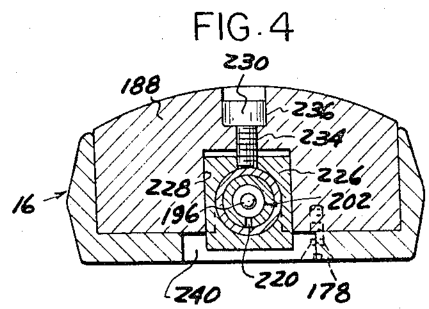
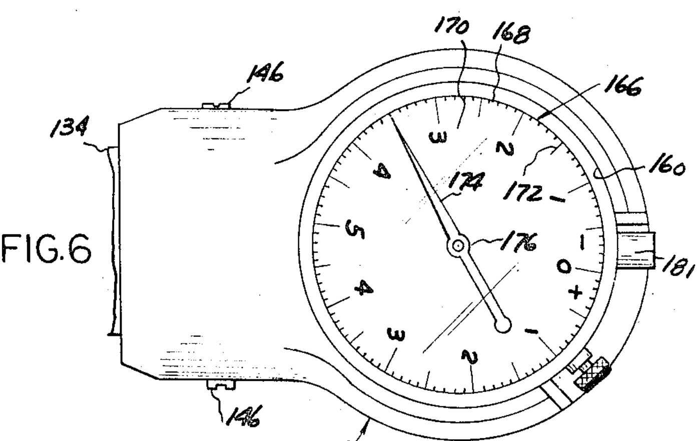
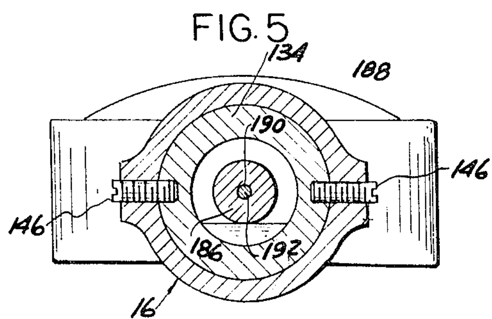
INVENTOR
ANDREW EISELE
BY Barthel & Bugbee
ATTORNEYS

United States Patent Office 3,296,707
Patented Jan. 10, 1967

3,296,707

PRECISION BORE GAUGE

Andrew Eisele, 20460 Brookwood Ave.,
Dearborn Heights, Mich. 48127

Filed Apr. 24, 1964, Ser. No. 362,318
11 Claims. (Cl. 33—178)

This invention relates to precision gauges and, in particular, to concentricity and perpendicularity gauges.

One object of this invention is to provide a precision bore gauge having means associated therewith for interchangeably using either a dial indicator or an air-plunger-operated indicator for showing the results of the bore measurement, such as bore concentricity.

Another object is to provide a precision bore gauge of the foregoing character wherein either the dial indicator or the air plunger unit may be interchangeably inserted and removed from the handle of the instrument in a quick and easy way.

Another object is to provide a precision bore gauge which is adapted to measure the concentricity of a bore and also the perpendicularity of a face or shoulder surface adjacent and transverse to that bore relatively to a reference bore or counterbore.

Other objects and advantages of the invention will become apparent during the course of the following description of the accompanying drawings, wherein:

FIGURE 3 is a bottom plan view of the handle portion of the bore gauge of FIGURES 1 and 2, looking in the direction of the arrows 3—3 in FIGURE 2;

FIGURE 4 is a vertical cross-section taken along the line 4—4 in FIGURE 2;

FIGURE 5 is a vertical cross-section taken along the line 5—5 in FIGURE 1; and

FIGURE 6 is a top plan view of the rearward portion of the bore gauge of FIGURE 1, but arranged for use with a dial indicator.

Figure 1:
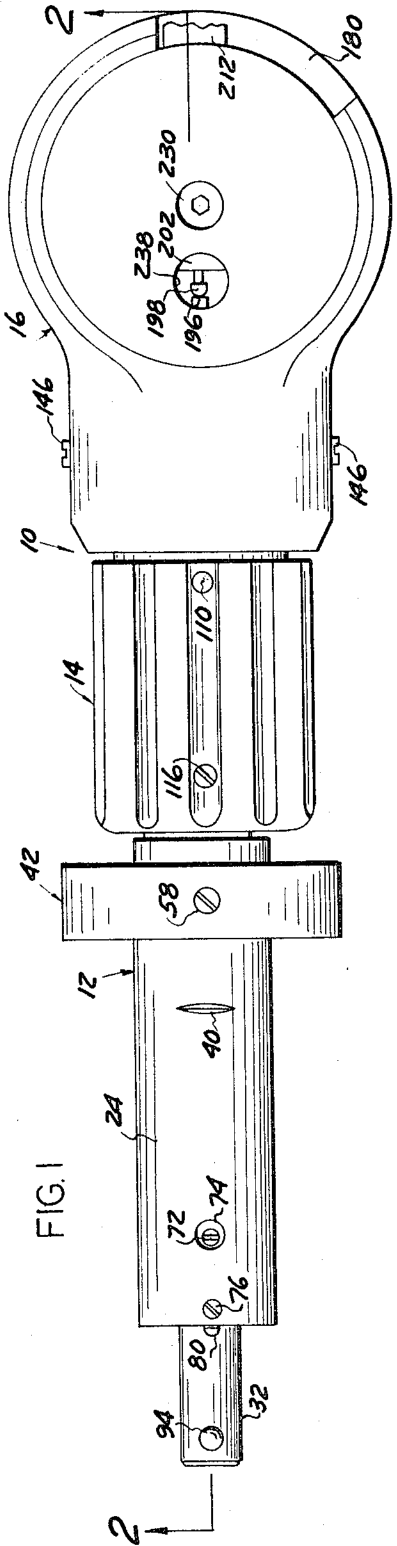
FIGURE 1 is a top plan view of a bore gauge according to one form of the invention, arranged for use with an air-plunger-operated indicator.
Figure 2:
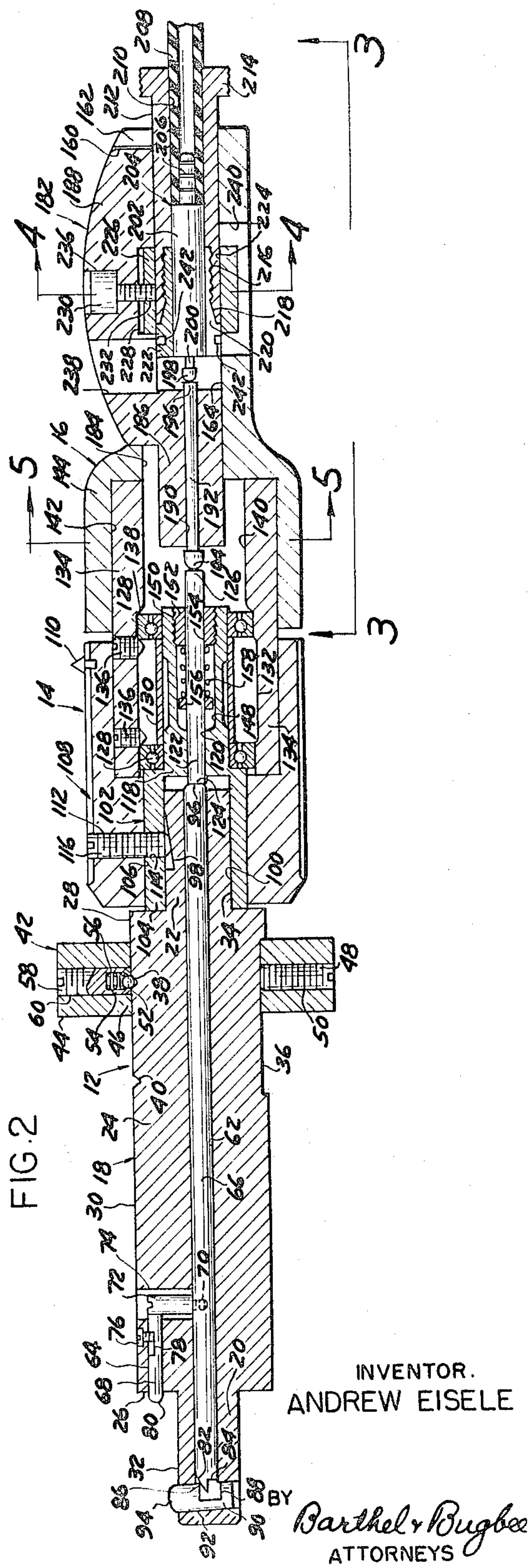
FIGURE 2 is a vertical section taken along the line 2—2 in FIGURE 1.

Referring to the drawings in detail, FIGURES 1 and 2 show a bore gauge, generally designated 10, as consisting generally of a measuring head, generally designated 12, constituting the forward end of the instrument 10 and removably held in a measuring unit, holder 14 which at its rearward end is provided with a hollow stationary support 15 to which is connected a stationary handle 16. As pointed out below, the handle 16 is adapted to interchangeably receive and utilize either a conventional dial indicator or a conventional air plunger indicator, according to the particular desires of the user and the conditions of measurement. The measuring head 12 is any one of a plurality of such measuring heads, of different diameters for fitting different sizes of bores, one only of those differently-sized but interchangeable measuring heads being shown in FIGURES 1 and 2.

Each measuring head 12 includes an elongated body 18 having at its forward end and rearward end reduced diameter portions 20 and 22 respectively and between them an enlarged cylindrical pilot portion 24 adapted to snugly fit the reference counterbore of the jig or workpiece to be measured. The pilot portion is separated from the reduced diameter portions 20 and 22 by annular transverse shoulder surfaces or faces 26 and 28 respectively perpendicular to the axes of the coaxial cylindrical surfaces 30, 32 and 34 respectively of the pilot portion 24 and forward and rearward reduced diameter portions 20 and 22. The cylindrical surface 30 of the body 18 serves as a pilot surface to fit the reference counterbore relatively to which the concentricity of the bore and the perpendicularity of the annular shoulder between it and the reference bore are to be measured. The pilot portion 24 on one side contains a recessed flattened surface 36 (FIGURE 2) extending lengthwise of the pilot portion 24 and diametrically opposite it are axially-spaced notches 38 and 40 for locating and temporarily holding in position a depth stop, generally designated 42.

The depth stop 42, as its name indicates, is for the purpose of regulating the depth to which the measuring head 12 is to be inserted in the bore to be measured. It consists of a collar 44 containing a bore 46 snugly but slidably fitting the cylindrical surface 30 of the measuring head body 18 and held in place by a set screw 48 threaded through a radial bore 50 into locking engagement with the recessed flattened surface 36. Before the set screw 48 is tightened into locking engagement, however, the depth stop 42 is quickly and conveniently located by sliding it along the body 18 until a detent ball 52 yieldingly engages one of the notches 38 and 40 when urged therein by a compression spring 54 within a socket 56 in the inner end of a set screw 58 containing the ball 52. The set screw 58 is threaded through a radial bore 60 in the collar 44 diametrically opposite the radial bore 50 containing the set screw 48.

The measuring head body 30 is provided with parallel central and peripheral bores 62 and 64 respectively, the former containing a forward motion-transmitting rod 66 and the latter an auxiliary measuring member or feeler 68. The forward motion-transmitting rod 66 is provided with a threaded socket 70 which receives the reduced diameter threaded lower end of a radial motion-transmitting pin 72 contained within an enlarged radial bore or hole 74 in the measuring head body 18, the enlargement permitting the pin 72 to move backward and forward parallel to its own axis as the forward motion-transmitting rod 66 moves back and forth within its bore 62. The radial motion-transmitting pin 74 is engaged by the rearward end of the auxiliary measuring member or feeler 68, the motion of which is limited by a set screw 76 engaging the ends of a slot 78 in the upper side of the measuring member or feeler 68. The latter has a rounded forward contact end 80 which projects forwardly from the annular shoulder surface 26.

The forward end of the forward motion-transmitting rod 66 is provided with an inclined end portion 82 (FIGURE 2) occupying approximately one-half of the width of the motion-transmitting rod 66, the other half being cut away or notched as at 84. The inclined surface 82 is disposed approximately 45 degrees to the axis of the motion-transmitting rod 66 and is engaged as a cam surface by the sharp edge 86 of a notch 88 in the side of a transverse measuring member or feeler 90 snugly but slidably mounted in a transverse bore 92 which is inclined upwardly and forwardly at an angle slightly greater than 90 degrees relatively to the axis of the bore 62 containing the motion-transmitting rod 66, an angle of 92 degrees having been considered satisfactory in this respect. The transverse measuring member or feeler 90 has a rounded contact end 94. The motion-transmitting rod 62 is provided with a substantially flat rearward end 96 projecting a short distance rearwardly from the rearward end of the reduced diameter portion 22 of the measuring head body 18, which is provided with a forwardly-inclined recess or flat-bottomed notch 98.

The cylindrical surface 34 of the reduced diameter-rearward end portion 22 of the measuring head body 18 is snugly but slidably received within a cylindrical bore 100 in a stepped sleeve or bushing 102. The bushing 102 has a forward portion 104 received within a bore 106 in a rotary fluted handle 108 provided at its rearward end with a sharp tipped position-indicating pin 110.

The bushing 102 at its forward end is provided with a threaded radial bore 112 aligned with a bore 114 in the forward portion 104 of the bushing 102. Threaded through the radial bores 112 and 114 into locking engagement with the inclined flat-bottomed notch 98 is a locking set screw 116 by which the measuring head 12 is removably locked in position. The stepped bushing 104 is provided with a reduced diameter rearward portion 118 containing an axial bore 120 aligned and coaxial with the bore 62 and snugly but slidably containing an intermediate motion-transmitting rod 122 having a substantially flat forward end 124 engaging the rearward end 96 of the motion-transmitting rod 66. The motion-transmitting rod 122 is also provided with a substantially flat rearward end 126. The forward end of the stepped sleeve 102 abuttingly engages the radial shoulder 28 while its rearward end portion 118 carries the inner races of spaced anti-friction bearings 128 spaced apart from one another by a spacing sleeve 130 carried by the reduced diameter portion 118, whereas the outer races thereof are disposed within a bore 132 within a sleeve 134 and held in spaced relationship against the rearward end of the enlarged portion 104 of the stepped sleeve 102 by the forward one of a pair of radial set screws 136 having conical inner ends, the rearward set screw 136 serving to hold the outer race of the rearward anti-friction bearing 128 against a shoulder 138 between the forward bore 132 and a reduced diameter rearward bore 140 in the sleeve 134.

The rearward end portion of the sleeve 134 is contained within a socket 142 in the shank 144 of the stationary handle 16. The shank 144 is drilled and threaded radially to receive a pair of set screws 146 (FIGURE 1) which engage and hold the sleeve 134 within the socket 142 with its rearward end engaging the rearward end of the socket 142.

The reduced diameter rearward portion of the stepped bushing 102 is provided with a counterbore 148, the rearward end of which is threaded at 150 to receive a screw plug 152 which is bored centrally at 154 to snugly but slidably receive the intermediate motion-transmitting rod 122. Press-fitted or otherwise tightly secured to the intermediate motion-transmitting rod 122 is a spring abutment collar 156 which receives the thrust of the forward end of a compression spring 158, the rearward end of which abuts the screw plug 152. The spring 158 is in a state of compression and thus normally urges the motion-transmitting rods 122 and 66 in a forward direction (to the left in FIGURE 2), thereby causing the transverse feeler 90 to move outward and the axial feeler 68 to move forward.

The stationary handle 16 is provided with a cup-shaped socket 160 (FIGURE 2) having a cylindrical side wall 162 and flat bottom wall 164. The socket 160 is of a size and shape sufficient to receive a conventional dial indicator, generally designated 166 (FIGURE 6), having a cylindrical casing 168 and a dial 170 provided with graduations 172 with which registers a pointer 174 on a rotary spindle or shaft 176. The shaft 176 is connected through motion-multiplying mechanism to a reciprocable plunger (not shown) which engages the end 126 of the intermediate motion-transmitting rod 122 when the dial indicator 166 is inserted for use within the socket 160. Such dial indicators are well known to those skilled in the gauge art and a further description thereof is deemed unnecessary. The bottom of the dial indicator casing 168 is drilled and counterbored to receive two or more screws 178, the heads of which are recessed into the counterbores, and the shanks of which are threaded into the bottom of the adapter body 188. The side wall 162 is provided with a gap or hole 180 in its periphery for the passage of the sleeve 212 and of a projecting portion 181 of the dial indicator.

The same screws 178 (FIGURE 2) serve to hold within the socket 160 an approximately cylindrical adapter, generally designated 182, which is of the same general shape as the dial indicator 166 so as to fit interchangeably with it into the socket 160, but which is slightly smaller in diameter so as to provide a clearance for removal. The side wall 162 of the socket 160 is provided with an arch-shaped hole 184 leading into the reduced diameter rearward bore 140 of the sleeve 134. The hole 184 has a flat bottom in the shape of a chord formed by the bottom 164 of the socket 160. Resting upon or closely adjacent the bottom 164 and extending through the hole 184 is an adapter stem 186 preferably integral with the dome-shaped cylindrical body 188 and containing a bore 190 coaxial with the bores 62 and 120 containing the forward and intermediate motion-transmitting rods 66 and 122 respectively. Snugly but slidably mounted in the bore 190 is a rearward motion-transmitting rod 192 coaxial with the forward and intermediate motion-transmitting rods 66 and 122 and having a rounded head 194 which engaged the flat rearward end 126 of the intermediate motion-transmitting rod 122.

The flat rearward end 196 of the rearward motion-transmitting rod 192 is engaged by the rounded head 198 of the pneumatic piston 120 which is reciprocable in the cylinder 202 of the pneumatic operating plunger device 204 of a conventional pneumatic measuring instrument (not shown). The cylinder 202 at its rearward end has a reduced diameter ribbed tubular stem 206 to which is connected to a flexible hose 208 leading to the air chamber of the conventional pneumatic measurement indicator (not shown) which has a measurement indicating pointer moving up and down within a casing having a graduated window which thereby indicates the measurement. Such pneumatic measuring instruments are well known to those skilled in the measuring instrument art and are made by various manufacturers. One such instrument marketed under the trade name "Plunjet" is made by the Sheffield Corporation, a subsidiary of the Bendix Corporation, and located at Springfield and Thomas streets in Dayton, Ohio, whereas another marketed under the trade name "Plungaire" is manufactured by the Freeland Gauge Company, 9942 Freeland, Detroit 27, Michigan. The present invention thus makes these conventional pneumatic measuring instruments interchangeable with conventional dial indicators in the applicant's bore gauge 10 of the present invention.

The plunger device 204 and the hose 208 are snugly mounted in a bore 210 of a sleeve 212 which at its rearward end is provided with an integral knurled head or flange 214 (FIGURE 2) and at its forward end with a threaded bore 216 opening into a conical entrance 218. Threaded into the bore 216 with a conical clamping portion 220 is a split collet chuck 222 which can be rotated by a spanner to clamp the cylinder 202 tightly in the bore 210 of the sleeve 212. The forward portion of the sleeve 212 in turn is mounted in a corresponding cylindrical bore 224 within an approximately cubical block 226. The latter is mounted for sliding adjustment within a parallel-sided approximately cubical recess 228 (FIGURE 4) and is adjusted by means of an Allen screw 230 threaded into threaded bore 232 in the top of the block 26, the shank of the screw 230 being rotatably mounted in a bore 234 and the head thereof in a counterbore 236 (FIGURES 2 and 4) in the center of the body 188 of the adapter 182. The body 188 is also provided with a vertical access bore 238 immediately over the plunger head 198 and leading downward thereto. Similarly, the bottom wall 164 of the stationary handle 16 is provided with an enlarged hole 240 (FIGURES 2 and 3) providing access to the block 226, sleeve 212 and spanner wrench holes 242 of the collet chuck 222.

In the operation of the bore gauge 10 with the pneumatic measuring instrument (not shown) connected thereto by the flexible hose 208, to measure the concentricity of a reduced diameter bore relatively to a reference bore of a diameter snugly fitting the pilot surface 30 of the pilot portion 24 of the measuring head 12, the operator loosens the set screw 48, moves the depth stop 42 forwardly until the detent ball snaps into the forward notch 40, and retightens the set screw 48. He then thrusts the reduced diameter forward end portion 32 of the measuring body 18 through the reference bore into the reduced diameter bore to be measured while at the same time he pushes the pilot portion 24 thereof snugly into the reference bore until he engages the depth stop 42 with the surface around the mouth of the reference bore. Meanwhile, the depth stop 42 holds the rounded end 80 of the axial measuring member or feeler 68 out of contact with the workpiece face.

The operator then holds the stationary handle 16 motionless in one hand while he rotates the rotary fluted handle 107 with his other hand, thereby rotating the measuring head 12 and causing the rounded end 94 of the transverse feeler or measuring member 90 to trace out an annular path around the internal surface of the reduced diameter workpiece bore which is being measured. While so doing, he observes the graduated scale on the indicator of the conventional pneumatic measuring instrument (not shown).

The indicating pointer of either instrument remains motionless if the measured bore is accurately concentric or coaxial with the reference bore but moves through a distance which is a measurement of the eccentricity if the measured bore is not accurately coaxial or concentric with the reference bore. This results from the fact that the eccentric bore surface pushes the rounded end 94 of the transverse feeler 90 into its bore 92, causing the sharp edge 86 of the notch 88 to slide along the inclined surface 82 of the forward end of the forward motion-transmitting rod 66, moving it rearwardly and consequently moving rearwardly the intermediate and rearward motion-transmitting rods 122 and 192 and the pneumatic piston 200 of the pneumatic operating plunger device 204. The motion of the piston 200 is transmitted by the air in the hose 208 to the measurement indicating portion of the instrument in a manner well known to those skilled in the measurement instrument art.

To measure the prependicularity of the annular shoulder or face adjacent the measured bore, the operator again loosens the set screw 48, moves the depth stop 42 rearwardly until its detent ball snaps into the rearward notch 38, and then retightens the set screw 48. He then pushes the pilot portion 24 of the instrument 10 further through the reference bore until the depth stop 42 engages the surface surrounding the mouth of the reference bore, thereby causing the transverse measuring pin or feeler 90 to move beyond the workpiece bore just measured. When this has occurred, the operator rotates the rotary handle 107, whereupon the rounded end 80 of the axial feeler 68 engages and traces out an annular path around the shoulder surface or face. If the shoulder surface or face is accurately perpendicular to the axis of the reference bore in the workpiece which is now snugly engaged by the pilot portion 24 of the measuring head 12, the axial feeler 68 remains motionless. If, however, the shoulder surface or face is not accurately perpendicular to the axis, it pushes the pin or feeler 68 axially against the motion-transmitting pin 72 (FIGURE 2), shifting the forward motion-transmitting rod 66 and consequently shifting the intermediate and rearward motion-transmitting rods 122 and 192 so as to shift the pneumatic plunger 198 and cause the deviation to be indicated on the graduated scale of the measurement indicator of the pneumatic measuring instrument (not shown).

If, on the other hand, the operator wishes to use a conventional dial indicator for his measurement operations, he unscrews the screws 178, thereby releasing the adapter body 188 (FIGURE 2). By grasping the knurled head or flange 214 and pulling upward and rearward upon it, he pulls the assembly of the sleeve 212 and pneumatic plunger device 204 out from the socket 160 of the stationary handle 16. The enlarged hole 184 therein permits the stem portion 186 to clear the socket 160 during withdrawal of the adapter body 188 while the arcuate gap 180 permits the lifting of the sleeve 212 and hose 208 out of the socket 160.

The operator then inserts the dial indicator 166 in the socket 160 by first inserting its plunger stem into and through the enlarged arch-shaped hole 184. Like the adapter body 188, the dial indicator 166 has a cylindrical casing 168 which is slightly smaller in diameter than the socket 160 so as to provide a sufficient clearance therebetween to enable removal of the dial indicator 166 by lifting it out of the socket 160. When the dial indicator 166 has been completely seated in the socket 160, the operator inserts the screws 178 through the bottom wall 164 of the stationary handle 16 into correspondingly located threaded holes in the bottom of the dial indicator casing 168 securing the latter firmly in position with its plunger engaging the rearward end 196 of the rearward measuring rod 192. The bore gauge 10 is then ready for measurement in a similar manner to that described above for the pneumatic measuring instrument. Any deviations from concentricity or perpendicularity of the measure bore and adjacent shoulder respectively are shown instantly by the motion of the needle or pointer 174 of the dial indicator 166 relatively to the graduated dial 170 thereof.

What I claim is:

1. A combined concentricity and perpendicularity gauge for measuring the concentricity and perpendicularity of a workpiece bore and adjacent transverse face respectively relatively to the axis of a reference bore, said gauge comprising
   - a hollow stationary support having a stationary handle with a dial indicator holder therein,
   - a rotary handle rotatably mounted on said stationary support,
   - an elongated stem connected in coaxial relationship to said handle for rotation thereby,
     - said stem having an external pilot portion adapted to snugly but rotatably fit the reference bore and a reduced diameter portion adjacent thereto with a shoulder face therebetween,
       - said stem having therein a main longitudinal bore coaxial with the axis of rotation of said rotary handle and a transverse bore disposed within said reduced diameter portion in communication with said longitudinal bore,
       - said stem also having therein an auxiliary longitudinal bore extending rearwardly from said shoulder face parallel to said main bore,
       - said stem also having a transverse passageway leading from said auxiliary to said main bore,
   - a transversely-reciprocable bore-concentricity measuring member reciprocably mounted in said transverse bore,
   - a longitudinally-reciprocable face-perpendicularity measuring member reciprocably mounted in said auxilary bore and extending into said transverse passageway,
   - and motion-transmitting mechanism extending from said measuring members through said stem and support to the dial indicator in said holder,
     - said motion-transmitting mechanism during rotation of said stem relatively to said support by said rotary handle being responsive to the transverse shifting of said bore measuring member as a result of eccentricity of the thereby-engaged workpiece bore relatively to said pilot portion and reference bore and also responsive to the longitudinal shifting of said face-measuring member as a result of non-perpendicularity of the thereby-engaged workpiece face relatively to the axis of said pilot portion and reference bore to shift the dial indicator.

2. A combined concentricity and perpendicularity gauge, according to claim 1, wherein said motion-transmitting mechanism includes a main motion-transmitting member movably mounted in said main longitudinal bore in operating engagement with said bore-concentricity measuring member and an auxiliary motion-transmitting member operatively connected to said main motion-transmitting member and operatively engageable with said face-perpendicularity measuring member.

3. A combined concentricity and perpendicularity gauge, according to claim 2, wherein said auxiliary motion-transmitting member includes a motion-transmitting pin rigidly mounted on said main motion-transmitting member within said transverse passageway.

4. A combined concentricity and perpendicularity gauge, according to claim 2, wherein said main and auxiliary motion-transmitting members are mounted for unitary reciprocation in said main longitudinal bore and transverse passageway respectively.

5. A combined concentricity and perpendicularity gauge, according to claim 4, wherein said face-perpendicularity measuring member engages a side of said auxiliary motion-transmitting member and moves the same sidewise parallel to its axis and perpendicular to the axis of said main motion-transmitting member.

6. A combined concentricity and perpendicularity gauge, according to claim 1, wherein said dial indicator holder includes a recess configured to fit a dial indicator, wherein a similarly-configured adapter body is removably mounted in said recess interchangeably with a dial indicator, and wherein a pneumatic piston-and-cylinder measurement indicator is mounted in said adapter recess in operative connection with said motion-transmitting mechanism.

7. A bore-measuring gauge interchangeably receiving and utilizing a dial indicator and a pneumatic plunger measurement indicator, said gauge comprising a hollow supporting structure including an elongated stem at one end and a handle at its other end with a dial indicator holder therein, said structure having a longitudinal bore extending through said stem to said handle and a transverse bore in said stem communicating with said longitudinal bore, a transversely-reciprocable bore measuring member reciprocably mounted in said transverse bore, motion-transmitting mechanism extending from said measuring member through said longitudinal bore to said dial indicator holder and including a reciprocable indicator operator, said motion-transmitting mechanism being responsive to the transverse shifting of said bore measuring member to shift said indicator operator, an adapter body configured to fit said dial indicator holder removably mounted therein interchangeably with a dial indicator, and a pneumatic piston-and-cylinder measuring indicator mounted in said adapter in operative connection with said indicator-operating member, said dial indicator including a recess adapted to receive a dial indicator and having a side wall with a hole therein disposed opposite said longitudinal bore in approximate alignment therewith, and said adapter body being of such size and shape as to fit into said recess interchangeably with the dial indicator and with a portion of the pneumatic measuring indicator projecting rearwardly through said hole.

8. A bore-measuring gauge, according to claim 7, wherein said adapter body is provided with a bore aligned approximately with said longitudinal bore and said hole, and wherein said pneumatic plunger measurement indicator includes a cylinder mounted in said bore.

9. A bore-measuring gauge, according to claim 8, wherein a cylinder-gripping chuck is mounted in said adapter body bore and wherein said cylinder is removably mounted in and gripped by said chuck.

10. A bore-measuring gauge, according to claim 9, wherein said adapter body has a guideway disposed transversely to the adapter body bore, wherein a clamping member with an aperture therethrough approximately coaxial with said bore is disposed in said guideway and said chuck extends through said aperture, and wherein means is provided in said adapter body for moving said clamping member and its aperture in said guideway transversely to the axis of said adapter body and thereby urging said chuck into clamping engagement between one side of said adapter body bore and the opposite side of said aperture.

11. A bore-measuring gauge, according to claim 10, wherein said means includes a threaded bore in said clamping member and a rotary threaded operating element rotatably mounted in said adapter body.

References Cited by the Examiner

UNITED STATES PATENTS

| | | | |
|---|---|---|---|
| 1,695,453 | 12/1928 | Carpenter | 33—178 |
| 2,574,342 | 11/1951 | Mennesson | 33—178 |
| 2,661,539 | 12/1953 | Lovenston | 33—172 |
| 2,692,439 | 10/1954 | Wilson | 33—174 |
| 2,700,224 | 1/1955 | Johnson | 33—174 |
| 2,721,392 | 10/1955 | Barrett | 33—178 |
| 2,998,656 | 9/1961 | St. Amour | 33—178 |

LEONARD FORMAN, *Primary Examiner.*

SAMUEL S. MATTHEWS, *Examiner.*